UNITED STATES PATENT OFFICE.

JOHN H. STEVENS, OF NEWARK, NEW JERSEY, ASSIGNOR TO THE CELLULOID COMPANY, OF NEW YORK, N. Y., A CORPORATION OF NEW JERSEY.

PYROXYLIN COMPOUND.

SPECIFICATION forming part of Letters Patent No. 589,870, dated September 14, 1897.

Application filed June 12, 1897. Serial No. 640,575. (No specimens.)

*To all whom it may concern:*

Be it known that I, JOHN H. STEVENS, of the city of Newark, county of Essex, and State of New Jersey, have invented a certain new and useful Composition of Matter, of which the following is a specification.

The composition to which my invention relates has for its base "soluble pyroxylin," by which I mean those lower forms of nitrocellulose which are easily soluble in a large number of menstrua, prominent examples of which are alcohol and ether mixtures, refined wood-spirit, and certain solutions of camphor, such as camphor dissolved in common ninety-five-per-cent. ethyl alcohol. In other words, I use a pyroxylin which is employed for making collodion, varnishes, waterproofing solutions, and the substance known as "celluloid."

Soluble pyroxylin dissolved in or combined with appropriate solvents forms a large class of mixtures or compounds useful for many purposes in the arts, dependent on the fluidity, solidity, color, transparency, or opacity of the resultant compound.

The state of the art is now so well known that further description is unnecessary. For a fuller explanation, however, I refer to my United States Patent No. 517,987 of April 10, 1894.

The pyroxylin compounds of the present specification are distinct from explosives. The commercial form of an explosive is only temporary, as its employment contemplates its chemical transformation into gases. The commercial forms of the compositions to which my invention relates are practically permanent and their chemical nature is unaltered by use. Explosives are not made to imitate any natural substance, whereas the compositions to which my invention refers are mainly intended to copy a great variety of natural substances. Prominent among these compositions, such as celluloid, for instance, which are used to imitate natural substances, are the transparent or partly-transparent products or imitations of glass, horn, tortoise-shell, and amber, and the liquid solutions used as cements, varnishes, and lacquers.

Soluble pyroxylin is a nitro-substitution product of cellulose. While it is a substance without taste or odor, it is, nevertheless, subject to decomposition. When this takes place, the acid elements generally separate and the pyroxylin turns sour, becomes discolored, weak in structure, emits a nitrous odor, corrodes surrounding objects, and becomes dangerous from liability to spontaneous combustion. These properties, in a modified degree, extend to compositions made from the pyroxylin, dependent largely upon the proportion of pyroxylin in the mixture. Excessive quantities of solvents, for instance, almost prevent such decomposition.

The experienced operator introduces substances into his mixtures which will neutralize the acid formed by decomposition, and he has found that the mere presence of such neutralizing agents or antacids will so hinder the formation of free acids that a small quantity of the antacid renders the pyroxylin products practically stable. The antacid substances generally used, however, impart a certain degree of opacity to these compounds, thus rendering the production of transparent effects difficult.

I have discovered that a pyroxylin solution or composition can be rendered stable by the addition of a small proportion of urea or carbamid. This forms the subject-matter of my application for Letters Patent, Serial No. 529,603, filed November 22, 1894.

Urea readily combines with acids, and consequently neutralizes any acid which may be present in the pyroxlin compositions. In addition to this I discovered that urea did not interfere in the slightest degree with the transparency, and thus I was enabled to make highly-transparent compositions of sufficient stability to replace wherever desirable the partially-transparent compositions heretofore made with other antacid substances.

This application is for a new pyroxylin composition containing one or more of a new class of substances possessing solvent power which I have discovered are also capable by their presence of preventing acid decomposition. At the same time they do not interfere with the transparency of the compound. This class of substances embraces certain organic urea salts known as the "urea salts of the monohydric monobasic fatty acids."

Urea on account of its known capacity for neutralizing acids might have been expected to act as an antacid in pyroxylin compounds. Of course it was not known that it formed perfectly-transparent products, especially because other antacid salts or substances, such as carbonate of magnesia, by reason of noncompatibility or chemical action cloud or injure these compounds in various ways; but my new class of antacid substances consists of salts made by saturating urea with certain fatty acids, and I have discovered that in spite of this fact these salts of urea are as efficient as urea.

The monohydric monobasic fatty acid salts of urea which I have used and found to be good for the purpose are urea formate, urea acetate, urea propionate, urea butyrate, and urea valerate.

The search for new solvents of pyroxylin is also productive of useful results, as is shown by the many patents issued for inventions in this line.

While the presence of solvents hinders the decomposition of the pyroxlin, the solid solvents, like camphor or acetanilid, for instance, are not as efficient as the liquid solvents in this respect, and the dry compounds containing the pyroxylin and solid solvent gradually decompose and become useless and dangerous unless protected with an antacid. The ideal solid solvent would be one which in addition to its solvent powers possessed antacid properties. One of the most valuable features of my urea-pyroxylin composition of matter consisted in the fact that the urea was a solvent of pyroxylin. Although a feeble solvent, it still assisted in the solvent action.

A valuable property of my new group of antacids is their solvent power. They are also feeble solvents and require peculiar conditions for a demonstration of their dissolving power, but this solvent property shows their compatibility with the pyroxylin and makes their combination therewith more perfect and assists the general solvent action. Most of them, especially the products of the higher acids, like the urea acetate and urea valerate, for instance, resemble urea in their ability when melted to dissolve pyroxylin of a medium solubility or pyroxylin suitable for weak solvents. As with urea the action is slow and requires some time. As is also the case with urea the solvent must not be heated much above its melting-point or there will be attendant decomposition. Urea and these salts of urea decompose easily at high temperatures. Pyroxylin also, especially if it contains the lowest or most unstable nitro compounds, discolors at a high temperature when immersed for several minutes in melted solvents, like camphor or acetanilid, for instance. It is apparent, however, on observing the action of pyroxylin in melted urea or these salts that the solution is a true one. The solutions in these melted substances are transparent, and the crystalline structure of the cooled solution is only due to the excess of solvent. The same thing happens with other solid solvents, like camphor, acetanilid, coumarine, dinitrobenzole, &c.

The object of showing the solvent power of substances melting at high temperatures is to indicate their action on pyroxylin under extraordinary conditions. The fact that pyroxylin dissolves in urea or these salts under conditions which favor the decomposition of both the solvent and pyroxylin indicates a useful solvent power for conditions more favorable. These more favorable conditions are the making of solutions at lower temperatures. This I have done and I find that from ordinary temperatures up to about 175° Fahrenheit the solution of urea or of these salts in a liquid solvent—absolute grain-alcohol, for instance—also strongly indicates the solvent power of urea and these urea salts and their ability to form colorless transparent compounds. Absolute grain-alcohol is one of the best known solvents of pyroxylin employed in the manufacturing class of compounds.

Both urea and the present group of urea salts increase the solvent power of the alcohol, so that when a pyroxylin is acted on which is not quite soluble in the alcohol alone the addition of urea or of these salts to a point of saturation will cause the pyroxylin to dissolve and form a highly-transparent liquid compound. The solvent weakness of urea or these salts prohibits their use as complete substitutes for such strong solid solvents as camphor; but their solvent power is an indication of their harmonious action with pyroxylin, as before stated, and helps to explain why they combine to form transparent compounds.

In practically applying my invention I add one or more of these salts of urea to any of the pyroxylin solutions or compounds, either liquid, solid, or pasty. They are added, preferably, dissolved in the solvent used in the compound. I find that they are sufficiently soluble in the ordinary menstrua employed to enable the introduction of the proper quantity for antacid effects. Urea acetate, for instance, dissolves in about seven and one-half parts of ninety-five-per-cent. grain-alcohol and in about three parts of wood-spirit.

No matter what the proportion of urea or these salts may be an absolute grain-alcohol solution of pyroxylin shows their solvent action through their ability to clear the solution or further dissolve the undissolved or partly-dissolved portions of pyroxylin. For the best observation of these phenomena enough pyroxylin should be used to form syrupy solutions—say of a consistency useful for spreading purposes—and if perfect clearness is wanted in the film, resulting from drying out the solution, excessive proportions of the urea must be avoided. Crystallizable solutions are useful for cementing and like purposes, but for other uses the proportion of urea or urea salts should not be sufficient to leave a crystallized residuum after evaporation, all of which is understood by those skilled in the art.

For the further guidance of the operator I would state that different members of the present group of antacids dissolve at ordinary temperatures in the prominent liquid solvents employed in these compounds about as follows, the proportions being by weight: In commercial wood-spirit of about ninety-seven-per-cent. strength the urea acetate seems to be the most soluble. They all dissolve in from three to six parts. In ninety-five-per-cent. grain-alcohol they dissolve in from eight to eleven parts, in absolute alcohol in from fourteen to twenty parts, in refined fusel-oil in from fifty to one hundred and fifty parts. The urea formate is apparently the least soluble in the fusel-oil and the urea acetate the most readily soluble. In acetone practically free from water they dissolve very sparingly—say in from one hundred and sixty parts to two hundred and thirty parts. In ninety-five-per-cent. acetone—that is, acetone containing five per cent. of water—they dissolve more readily—say in from seven to eighteen parts. These solubilities are simply given to indicate to the operator the comparative effects of the different solvents and enable him to add the antacid in a dissolved state, which is most favorable for transparency in the final product.

Probably on account of the compatibility of these new antacids with pyroxylin and its compounds they seem to dissolve more readily in the entire combination of solvent and pyroxylin. When making a solid compound, also the mastication and heat apparently stimulate the solvent action, so that it is extremely easy to form a transparent compound with the proportions I recommend, which are from one per cent. to five per cent. of the new antacid salt to the pyroxylin. Very efficient proportions are two per cent. The minimum proportions are used in cases where exceptionally severe treatment, like heating, for instance, is not required. The two-per-cent. proportion answers about every condition, and more than this is seldom necessary. There are cases where either a minimum amount of liquid solvent is used in connection with a solid solvent or actually none at all, as is well understood. In the latter case the proper proportion of urea salt must be introduced by first dissolving it in a non-solvent of the pyroxylin, a weak grain-alcohol, for instance, and then saturating the mixture of pyroxylin and solid solvent with this solution. When the liquid solvent has evaporated, the urea salt will be found in close combination.

The presence of such easily-soluble solid solvents as camphor is not incompatible with such a method, for the camphor will also be left behind after the liquid solvent has evaporated; but the urea salts are not specially applicable to this process if camphor is present, and, in fact, the transparent compounds are not generally made in this way. An alcohol with excess of water is apt also to decompose the urea salt.

Pyroxylin which is to be kept in a dry state can be rendered stable by treating it with a solution of the urea salt in a non-solvent liquid. I have, for instance, treated pyroxylin with a solution of urea acetate in ninety-five-per-cent. grain-alcohol and obtained a urea acetate pyroxylin combination after the drying out of the alcohol. This ordinary alcoholic solution of urea acetate was not a solvent of pyroxylin.

My compositions containing these urea salts are permanent as to remaining undecomposed and are of good color. These urea salts combine perfectly with my compositions and do not separate therefrom in a frosty exudation peculiar to many of the substances which at first readily combine with these compositions, but which afterward give trouble by reason of this property. Articles made from these compositions do not deteriorate or lose their polish or finish. They can be colored to form beautiful glass-like effects and do not fade with age any more than the best pyroxylin compositions.

I do not claim for my new compositions, especially those of a transparent nature, any extraordinary stable property beyond what is now obtained with other antacid substances. When used in small amounts, for instance, the operator must be just as careful as ever in regard to using heat and in avoiding the over seasoning of the material.

No transparent composition can be made to resist excessive heating as well as the opaque compounds, because, as is well known, the opaque compounds permit the introduction of very large proportions of antacid substances.

While it sometimes seems easy to explain a fact after it has been discovered, I must admit my inability to explain the chemical reactions which enable these salts of urea, already saturated with acid, to prevent acid decomposition in these highly-unstable compounds of the low forms of pyroxylin and apparently unite with the nitrous elements evolved during such decomposition or already existing as impurities in the nitrocellulose.

There is probably no production of free aliphatic acid during the reaction, for I find that the color of the pyroxylin compound is apparently as little injured and metals in contact therewith remain as free from stain as when urea is used under the same proportions and conditions.

While my new group of antacids and solvent substances will render opaque or translucent pyroxylin compositions permanent, their special value is in the transparent products, for the reason that there are already many efficient antacid substances useful in the opaque or translucent compositions. A large part of the novelty of my invention lies in the fact that I can make permanent compositions of a transparent nature by the use of this new group of substances.

For particular purposes the operator may desire to use greater proportions of the group of urea salts than those I have given. He will of course finally reach a point where excessive proportions will injure his compounds. However, he can use more than the five per cent. that I recommended and still maintain transparency, but I would not advise putting much more than five per cent. into the mixture if he desires good transparency. It is not necessary, and only the desire for other effects will induce him to use proportions, which, if excessive, will finally weaken the compound and make it susceptible to the action of water. I do not confine myself, therefore, to any particular proportion short of efficient quantities.

While I recommend the use of either any one or all of the members of this group of solvent antacids, the operator will find that urea acetate is capable of doing practically everything claimed for the rest, and I prefer to use it, but the urea acetate, as well as the other salts, must not be expected to perform all I claim for them unless they are fairly pure. I have, for instance, employed an acetate of urea, which while I found it efficient for antacid purposes was sufficiently impure to prevent any exhibition of solvent power when melted by heat, and in using this impure quality I was led to believe that urea acetate was not a solvent of pyroxylin.

Some of these salts of urea are not described in books of chemistry. They are theoretically known, however, for it is well understood that urea combines with acids to form salts. I have found no difficulty in producing them. I recommend making them by simply heating equivalent combining weights of urea and acid. The combining weight of urea is sixty. The combining weights of the acids are: formic acid, forty-six; acetic acid, sixty; propionic acid, seventy-four; butyric acid, eighty-eight; valerianic acid, one hundred and two. To form acetate of urea, therefore, I must use sixty parts of urea and sixty parts of glacial acetic acid. In practice I employ a slight excess of the appropriate acid at a temperature not above 140° to 150° centigrade. All combine easily except, possibly, the valeric acid, which requires somewhat high temperatures, say about 140° to 150° centigrade, given as the high limit.

The excess of acid should preferably be evaporated and out of contact with the air to avoid the moisture which air generally contains. This is best done in an ordinary vacuum. If the presence of free acid is feared, the salt can be washed with ether and the ether recovered. All of these salts are colorless crystalline compounds, possessing a slight odor of the acid from which they are made.

I am aware that urea has been used as an antacid ingredient of nitro-explosives, and I have used it myself in transparent pyroxylin compounds for imitating natural products. I am also aware that urea nitrate has been used as an ingredient in nitrocellulose explosives, and that one of the objects of its use by Wanklyn was to preserve the compound against deleterious chemical changes; but, while urea nitrate makes stable explosives with nitrocellulose, there is nothing publicly known as to its action in connection with the peculiarly-unstable grade of pyroxylin employed in my compounds and in the methods used in forming and manipulating them or as to its ability to produce transparent pyroxylin compositions, having also the other qualities necessary to make them of value in commerce. In fact, I have ascertained by actual experience that among other unavailable related substances urea nitrate is an extremely undesirable ingredient of compositions like mine, as it discolors them, destroys delicate tints, and its compounds cannot be used in metal dies or in contact with the metal plates used in polishing these materials on account of the corrosive, unstable character it imparts to these non-explosive or "celluloid-like" compounds.

What I claim, and desire to secure by Letters Patent, is—

1. The new composition of matter consisting of soluble pyroxylin in combination with one or more of the urea salts of the monohydric monobasic aliphatic acids; namely, urea formate, urea acetate, urea propionate, urea butyrate and urea valerate.

2. The process for rendering soluble pyroxylin compounds stable, which consists in introducing into the compound one or more of the urea salts of the monohydric monobasic aliphatic acids; namely, urea formate, urea acetate, urea propionate, urea butyrate and urea valerate.

3. The new composition of matter consisting of soluble pyroxylin in combination with urea acetate.

4. The process of rendering soluble pyroxylin compounds stable, which consists in introducing urea acetate into the compound.

JOHN H. STEVENS.

Witnesses:
ABRAHAM MANNERS,
SAML. MEEKER.